(12) United States Patent
Zoppas

(10) Patent No.: US 6,612,634 B1
(45) Date of Patent: Sep. 2, 2003

(54) GRIPPERS FOR HANDLING PREFORMS

(75) Inventor: Matteo Zoppas, Fontanafredda (IT)

(73) Assignee: SIPA S.p.A., Vittorio Veneto (IT)

( * ) Notice: Subject to any disclaimer, the term of this patent is extended or adjusted under 35 U.S.C. 154(b) by 0 days.

(21) Appl. No.: 10/009,170

(22) PCT Filed: Apr. 25, 2000

(86) PCT No.: PCT/EP00/03679

§ 371 (c)(1),
(2), (4) Date: Dec. 7, 2001

(87) PCT Pub. No.: WO00/76746

PCT Pub. Date: Dec. 21, 2000

(30) Foreign Application Priority Data

Jun. 9, 1999 (IT) .......................... PN990023 U

(51) Int. Cl.[7] .............................. B25J 15/08
(52) U.S. Cl. ...................... 294/106; 294/99.1
(58) Field of Search ................ 294/104, 106, 294/99.1, 28, 33, 90, 116; 901/31, 39

(56) References Cited

U.S. PATENT DOCUMENTS 4,858,980 A * 8/1989 Dreisig et al. ............. 294/99.1
4,879,802 A * 11/1989 Winkler et al. ............. 483/36
5,102,177 A * 4/1992 Dreisig et al. .............. 294/106
5,267,766 A * 12/1993 Geissler ....................... 294/116

FOREIGN PATENT DOCUMENTS

| DE | 29713510 | 8/1998 |
| FR | 2720679 | 12/1995 |

* cited by examiner

Primary Examiner—Dean J. Kramer
(74) Attorney, Agent, or Firm—Wenderoth, Lind & Ponack, L.L.P.

(57) ABSTRACT

Preform gripper comprising a handling arm (1) and a preform support plate (2) that has at an extremity thereof a semi-circular aperture (7) that is adapted to accommodate a cylindrical portion (28) of the collar of the preform. Hinged on said plate there are provided two parallel side gripping members (5, 6), two end portions of which (13, 14) are in the shape of an arc of a circle and are adapted to elastically move closer to each other up to a pre-established position. The gripper is adapted to, enable said cylindrical portion (28) of the collar of the preform to be fitted into and removed from, with a snap-like action, said semi-circular aperture (7) by pressing and pulling, respectively, the preform against two opposite, elastically enlargeable outer edges (31, 32) of said two side gripping members (5, 6).

7 Claims, 4 Drawing Sheets

GRIPPERS FOR HANDLING PREFORMS

BACKGROUND OF THE INVENTION

1. Field of the Invention

The present invention refers to a gripper adapted to most effectively, and in a semi-automatic manner, seize, ie. hold firmly, and release cylindrical bodies.

Although, for reasons of greater descriptive simplicity, reference will be made to preforms of thermoplastic material used in the production of containers in the following description, the present invention shall of course to be understood as applying also to other cylindrical bodies used in different applications, as far as they do not depart from the scope of the appended claims.

2. Description of Related Art

It is known, from DE 29713510 and FR 2720679, grippers for seizing and firmly holding preforms comprise a handling arm, a pair of symmetrical, elastically diverging members, and connecting means between said arm and said symmetrical members. The latter are shaped so as to form a concavity whose opposite arms are arranged and sized in such a manner as to enable a cylindrical portion of the collar of a preform to be inserted therein by means of a simple pressure of said collar against the outer portions of said concavity, which, owing to the action of such a pressure, are caused to be enlarged by such an extent as adequate to enable the collar of the preform to slip into said concavity in which it is then retained.

However, such an operation and the particular type of gripper used to carry it out, drawbacks as described below.

The preform may be subjected to both axial and transversal stresses. In order to be able to withstand such stresses., the symmetrical members must possess a considerable elastic strength.

However, the required extent of the elastic strength brings about a considerable friction between the arms and the outer surface of the preform, which therefore undergoes a slight abrasion, considering that it is made of thermoplastic material that is only slightly heated up. In a situation of large-scale series production. The slight abrasions cause tiny particles, ie. the so-called "flour" of the plastic material involved to be produced, which contaminate the adjacent parts of the plant and disturb the regular flow of the subsequent process operations thereby making them inaccurate.

If, on the other hand, such an undesired effect has to be reduced, the need arises for the elastic gripping force of the arms to be reduced. Such a constraint, however, is largely known to all those skilled in the art to bring about corresponding inaccuracies in the positioning of the preform, with clear handling difficulties resulting therefrom.

Moreover, making grippers provided with holding arms having a considerable elastic strength implies a production that requires a far higher extent of accuracy and, therefore, is much more expensive.

BRIEF SUMMARY OF THE INVENTION

It is therefore a main purpose of the present invention to provide a gripper for handling cylindrical bodies, and in particular plastic preforms, which does away with the above described drawbacks and, at the same time, is compact, safe and reliable in its operation, and requires a simple, reliable construction based on the use of readily available techniques.

Such a type of gripper is obtained and implemented with the characteristics that are substantially described with particular reference to the appended claims.

BRIEF DESCRIPTION OF THE DRAWINGS

In any event, features and advantages of the present invention can more readily be understood from the description that is given below by way of non-limiting example with reference to the accompanying drawings, in which.

DETAILED DESCRIPTION OF THE INVENTION

Figure 1:
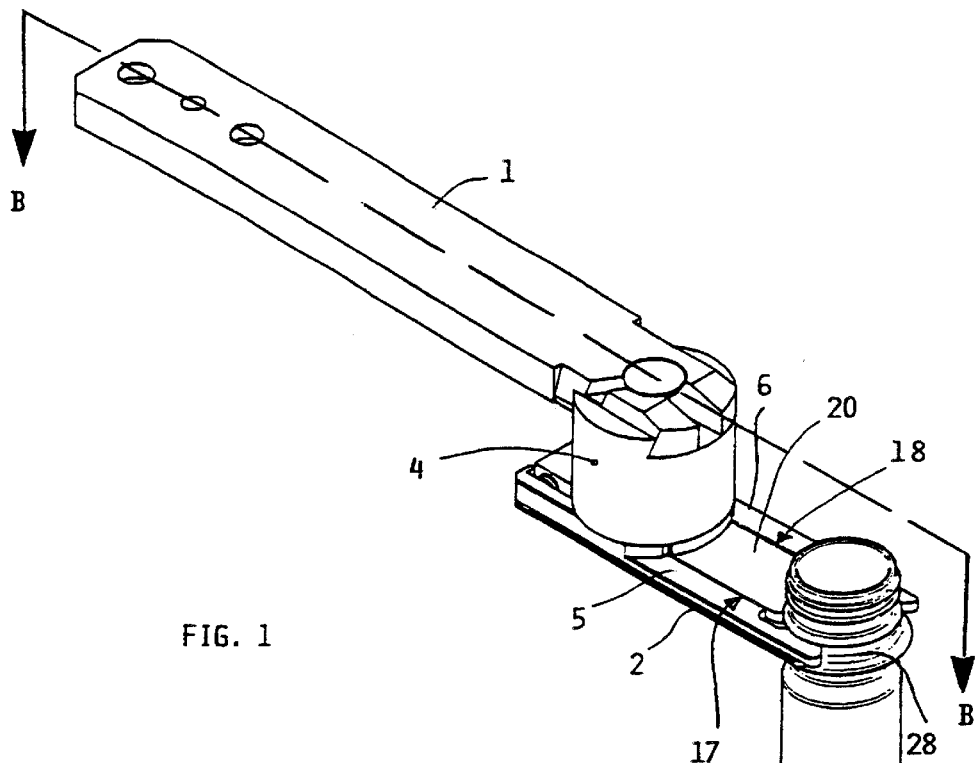
FIG. 1 is a perspective view of a gripper according to the present invention.

With reference to the above Figures, the gripper according to the present invention comprises a handling arm 1, a plate 2 for seizing and supporting the preform 3, an interconnection means 4 provided between the arm and the plate and firmly joined thereto, two symmetrical side gripping members 5 and 6, and a cylindrical spring 8 provided in hole 33 between corresponding extremities of the gripping members 5 and 6.

Plate 2 is provided, at an extremity thereof, with a semi-circular aperture 7 having a diameter adequate to accommodate a part of a cylindrical portion 28 of the collar of preform 3.

It is, however, possible for the aperture to be given a non-circular shape, and, for example, alternatively have a non-circular shape, as long as the aperture is capable of coupling with an adequate portion of the collar of the preform.

Plate 2 is furthermore provided, in correspondence of the opposite side edges thereof, with two grooves 9 and 10 adapted to accommodate a side gripping members 5 and 6, respectively.

Side gripping members 5 and 6 are hinged on interconnection means 4 by means of appropriate pivotally connecting means (pivots, pins and the like). Since interconnecting means 4 is firmly joined with plate 2, side gripping members 5 and 6 are substantially attached to plate 2. However, side gripping members 5 and 6 are able to slightly rotate with respect to plate 2 as a result of the pivotally connecting means engaging with appropriate holes 11 and 12 provided in side gripping members 5 and 6, respectively.

Side gripping members 5 and 6 are provided at extremities 13 and 14, respectively, located in correspondence with the semi-circular aperture 7 having two arcs of a circle 15 and 16.

On the opposite side of extremities 13 and 14 there is provided a cylindrical compression spring 8 which, as such, is biased to keep said extremities 13 and 14 closed, or at least approached to each other. Extremities 13 and 14 have a limited separation gap because the inner sides 17 and 18, respectively, of extremities 13 and 14 are adapted to abut against the outer edges of a central relief 20 of support plate 2, as illustrated in particular in FIGS. 1 and 5.

Side gripping members 5 and 6 are adapted to move into at least a resting position and at least a working position. The resting position is determined by the action of spring 8 that tends to move extremities 13 and 14 closer to each other up to the point at which the stopping action of central relief 20 comes into play.

Figure 7:
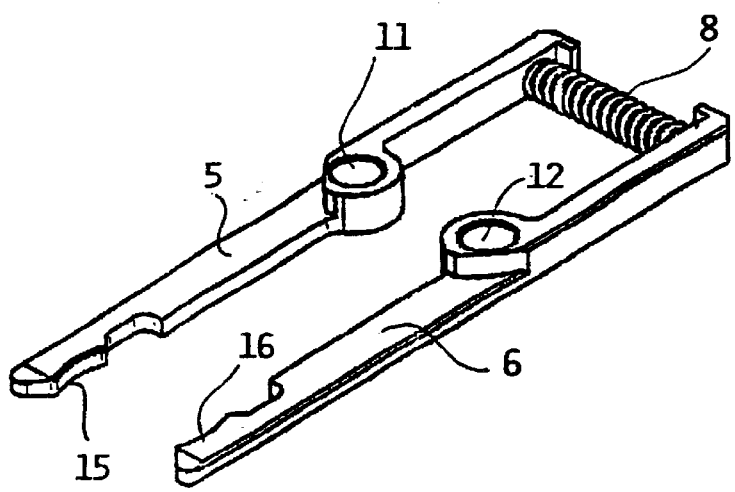
FIG. 7 is a perspective view of a partial assembly of some component parts of the gripper illustrated in FIG. 1.
Figure 8:
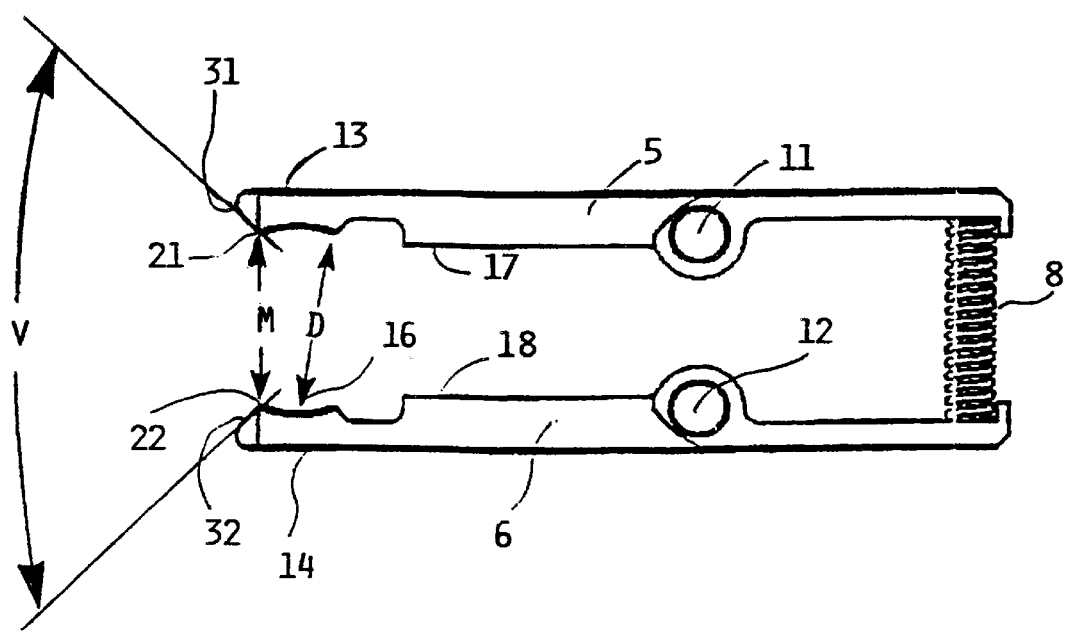
FIG. 8 is a top plan view of the assembly illustrated in FIG. 7.

In the resting position, arcs 15 and 16 move into an arrangement as illustrated symbolically in FIGS. 7 and 8, i.e. they outline a circle whose diameter D is slightly smaller than the diameter H of the semi-circular aperture 7, and the outer edges 21 and 22 of arcs 15 and 16, respectively, are located at a distance M that is smaller than said diameter D and is also smaller than the outside diameter of the preform.

Figure 6:
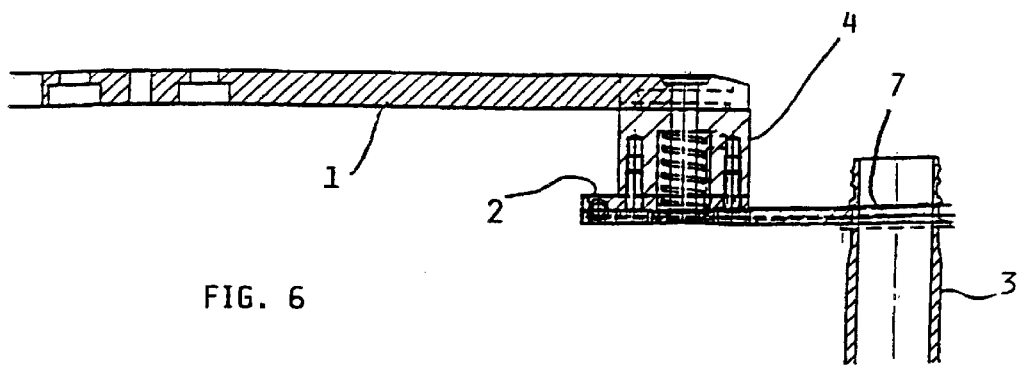
FIG. 6 is a view along the A—A section of the gripper illustrated in FIG. 5.
Figure 5:
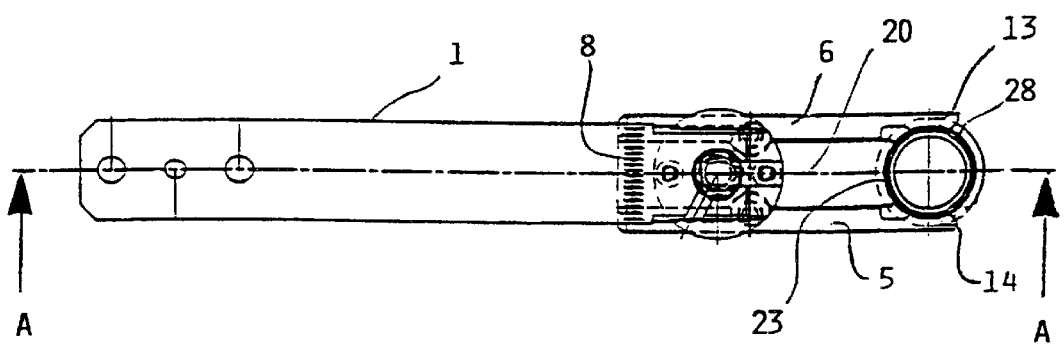
FIG. 5 is a view along the B—B section of the gripper illustrated in FIG. 1.

The working position is illustrated in FIGS. 1, 5 and 6. It can be noticed in the figures, that preform 3 is inserted within said semi-circular aperture 7, where it is retained by arcs 15 and 16 which are pressed against cylindrical portion 28 of the collar of preform 3 by the effect of the elastic action of the spring 8 and also owing to the fact that the diameter of the collar is greater than the diameter D of arcs 15 and 16 of a circle in the resting position of semi-circular aperture 7. When preform 3 is so inserted, arcs 15 and 16 of a circle are deflected outwardly, thereby causing preform 3 to be firmly held.

Figure 2:
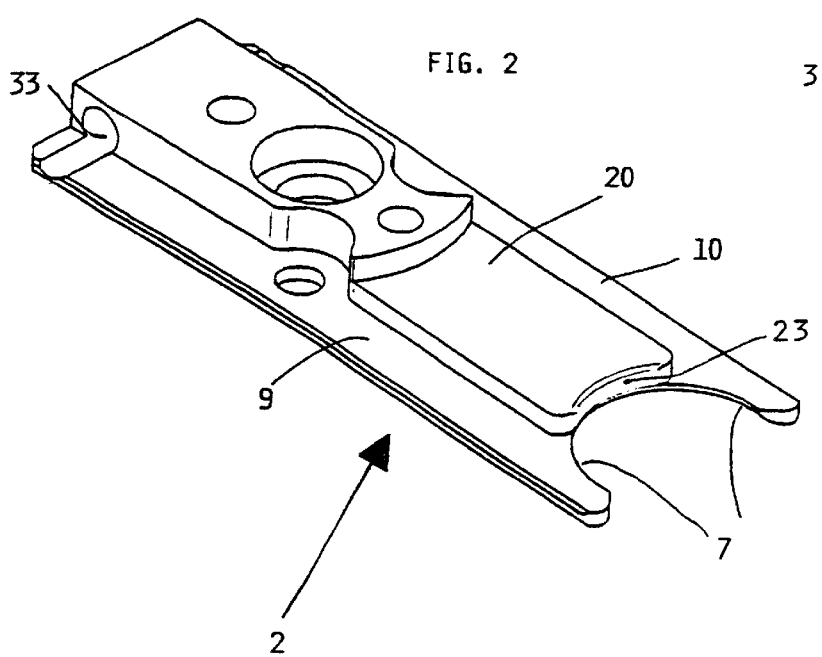
FIG. 2 is a similar perspective view of a component part of the same gripper illustrated in FIG. 1.
Figure 4:
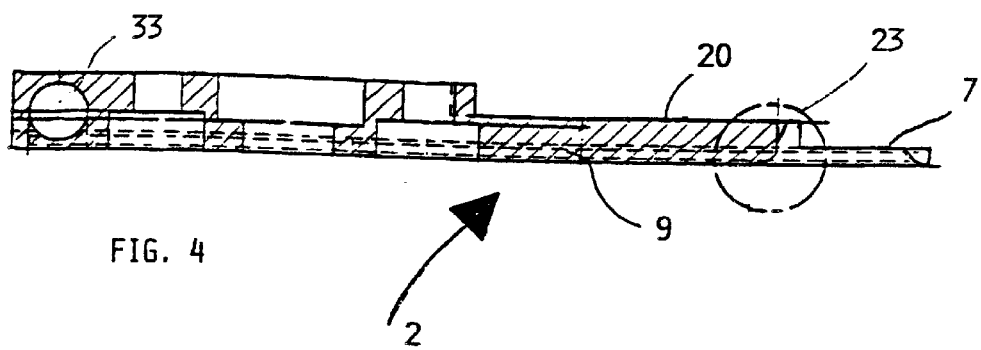
FIG. 4 is a view along the A—A section of the component part illustrated in FIG. 3.
Figure 3:
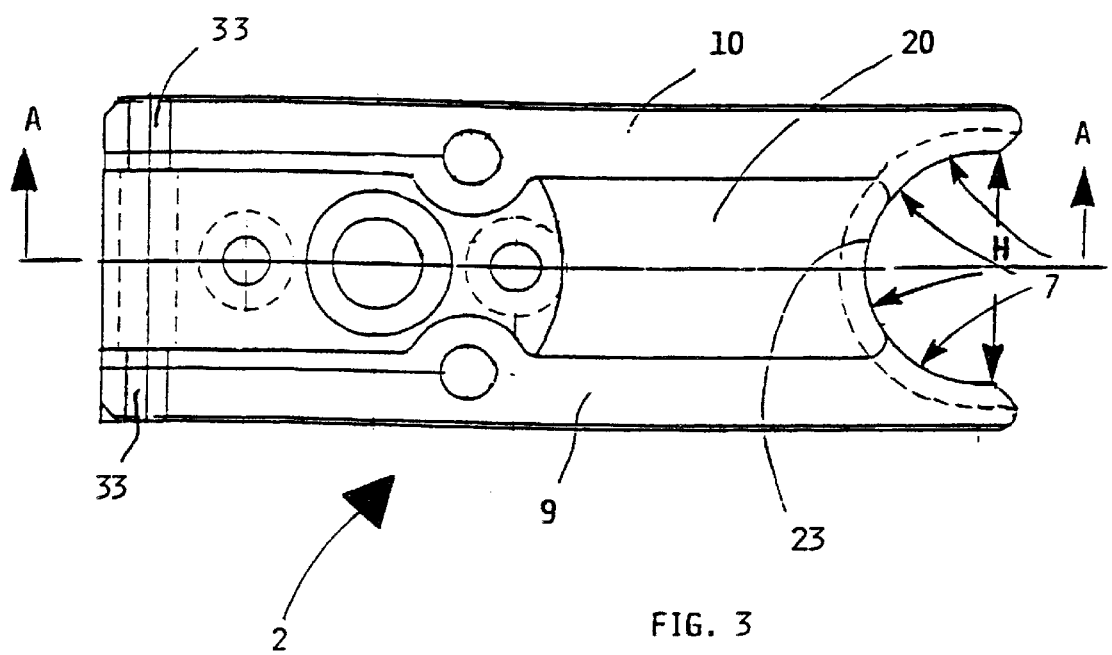
FIG. 3 is a top plan view of the same component part illustrated in FIG. 2.

In an advantageous manner, the preform retaining action can be further improved if central relief 20 is provided, in correspondence of the edge thereof which is adjacent to semi-circular aperture 7, with abutting means in the shape of an arc of circle 23, as illustrated in particular in FIG. 2, which is adapted to fittingly couple with cylindrical portion of the collar of preform 3, as illustrated in FIGS. 1, 5 and 6.

In this way, the combined effect of side members 5 and 6 elastically closing and abutting means 23 moving to couple against the collar of preform 3 causes the latter to be firmly held, in an elastically releasable manner, against the described gripper.

It is in fact sufficient for an appropriate portion of the collar of preform 3 to be pressed in an axial direction into semi-circular aperture 7 in order to cause side gripping members 5 and 6 to move apart by an adequate extent, thereby allowing for preform 3 to slide into semi-circular aperture 7. When side gripping members 5 and 6 are then so moved into such a position, they tend to return to their resting position, owing to the action of spring 8, thereby causing the collar of preform 3 to be firmly held.

To sum up, the grippers for use with preforms having a collar portion, according to the invention include a handling arm 1, means 2 adapted to support and handle the preform 3, interconnection means 4 provided between arm 1 and means 2 and firmly joined thereto, support means 2 is formed by a plate made in a single integral piece that is provided, at an extremity thereof, with a preferably semi-circular aperture 7 adapted to move into coupling with and accommodate a portion 28 of the collar of the preform 3. The grippers further include two preferably symmetrical, parallel side gripping members 5 and 6 hinged on to the plate, whose two extremities 13 and 14, respectively, are formed with contours 15 and 16, respectively, adapted to be capable to move into a fitting coupling with two respective portions of the collar of preform 3, and are further adapted to elastically move closer to each other up to a pre-determined position.

It should be particularly noticed that, with such an embodiment, the side stresses on the preform are easily neutralized by the resistance of the arms of semi-circular aperture 7, without any consequence on the capability thereof to grip and hold preform 3 in a firm and efficient manner. On the other hand, the axial stresses determined by preform 3 being inserted in and released from the gripper may be limited to any desired extent by simply adjusting the characteristics of the spring 8 accordingly, without impairing the stability in any way and, above all, the precision of the position in which preform 3 is held, owing to the effect of the abutting means 23 getting so coupled.

A further improvement in the way in which the preform is inserted is easily obtained if two side gripping members 5 and 6 are provided, at extremities 13 and 14, respectively, with edges 31 and 32, respectively, having appropriate flared shapes and arranged so as to define a V-shaped or funnel-shaped configuration in view of facilitating preform 3 to move into self-positioning and in view of facilitating extremities 13 and 14 to move apart under the action of even a moderate axial pressure exerted by the preform.

It shall be appreciated that the description and illustrations given above with reference to the accompanying drawings have been given as a mere example of the present invention, and that a number of variants and modifications can therefore introduced thereto without departing from the scope of the present invention.

What is claimed is:

1. A gripping device operable to grip a preform having a collar portion, said gripping device comprising:

a handling arm;

support means adapted to support and handle the preform, formed by a plate made in a single integral piece that is provided at an extremity thereof with a semi-circular aperture adapted to move into coupling with and accommodate a cylindrical portion of the collar of the preform;

interconnection means provided between said arm and said support means and firmly joined thereto;

two symmetrical, parallel side gripping members hinged onto said plate, whose two extremities are formed with respective contours adapted to be capable to move into fittingly coupling with two respective portions of the collar of the preform, and are further adapted to elastically move closer to each other up to a pre-determined position;

one or more elastic members that operate in a compressing mode on said two side gripping members on the opposite side of said respective extremities, wherein said elastic members comprise a cylindrical spring operable to provide a force between said elastic members, wherein said plate is provided, on the opposite side of said extremities, with a hole adapted to accommodate said spring, characterized in that said plate is provided centrally with a relief portion, a resting position of said side gripping members being abutting against respective grooves of said relief portion.

2. A gripping device according to claim 1, wherein said relief portion is provided, on the edge thereof which is adjacent to said aperture with a step-like abutment that is adapted to fittingly couple with said cylindrical portion of the collar of the preform.

3. The gripping device according to claim 1, wherein said two side gripping members are provided with respective outer edges that are so oriented as to be able to define a funnel-shaped or V-shaped configuration adapted to facilitate the insertion of said cylindrical portion of the collar of said preform.

4. The gripping device according to claim 3, wherein said relief portion is provided, on the edge thereof which is adjacent to said aperture, with a step-like abutment that is adapted to fittingly couple with said cylindrical portion of the collar of the preform.

5. The gripping device according to claim 1, characterized in that it is adapted to enable said cylindrical portion of the collar of the preform to be fitted into and removed from said aperture, with a snap-like action, by simply pressing and pulling, respectively, said cylindrical portion against outer edges capable of widening elastically of said two side gripping members.

6. A gripping device operable to grip a preform having a collar portion, said gripping device comprising:

a handling arm;

a support plate having an aperture formed at an extremity thereof, the aperture having a shape capable of accommodating a first portion of the collar;

an inner connecting device connecting said handling arm to said support plate;

a gripping member having a pivot point and an extremity that is shaped to conform with a contour of a second portion of the collar, said gripping member being pivotally attached to said support plate at the pivot point, said gripping member being operable pivot about the pivot point such that said extremity moves between a first position and a second position; and a biasing device operable to provide a biasing moment to said gripping member such that said extremity is biased in a direction toward the second position, wherein said biasing device is disposed at a position such that the pivot point of said gripping member is positioned between said biasing device and said extremity, wherein said support plate comprises a relief portion having a groove, and wherein said relief portion is disposed such that said gripping member, at the second position, abuts against the groove.

7. The gripping device according to claim 6, wherein said relief portion comprises an abutment disposed adjacent to the aperture.

* * * * *